Aug. 20, 1957    F. H. ERDMANN    2,803,528
PACKING SUPPORT FOR FLUID-LIQUID CONTACTING VESSELS
Filed May 13, 1954    3 Sheets-Sheet 1
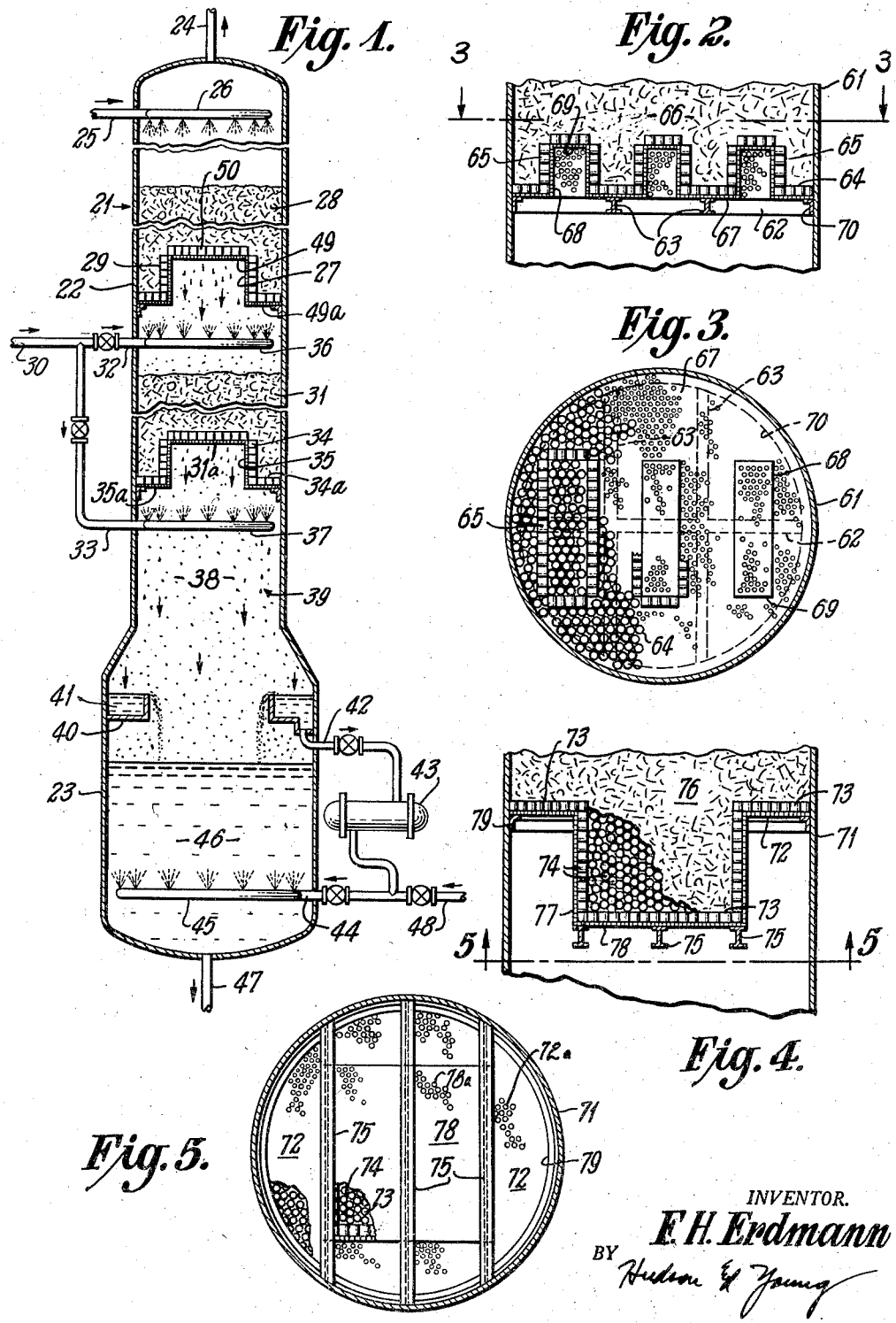
INVENTOR.
F. H. Erdmann
BY Hudson & Young
ATTORNEYS

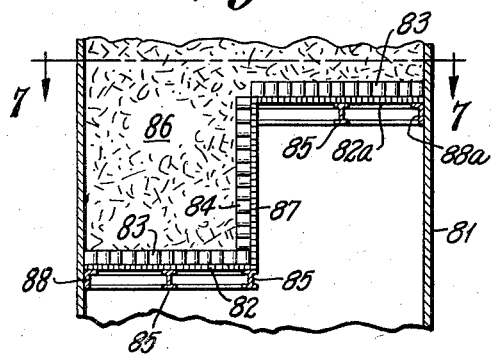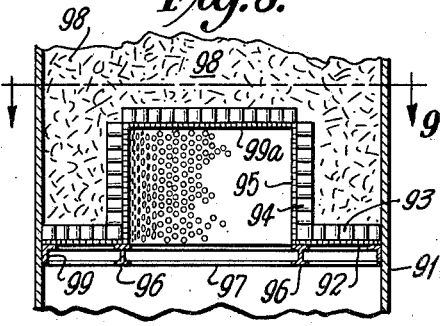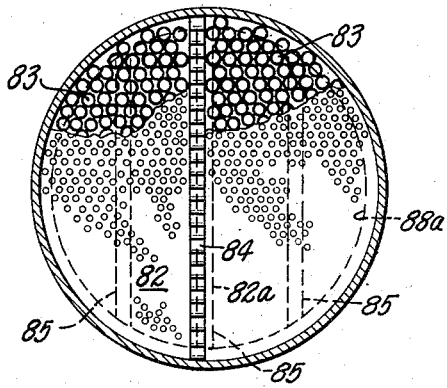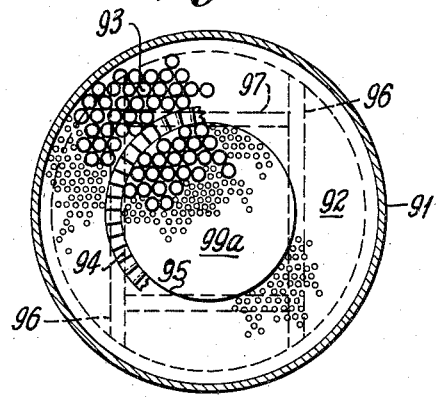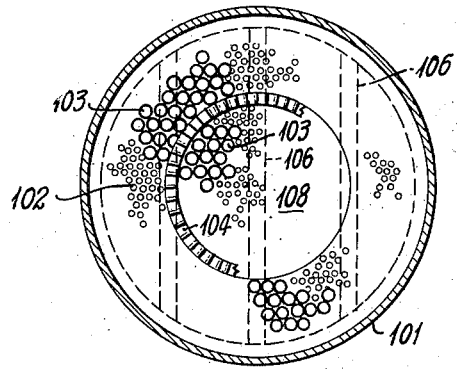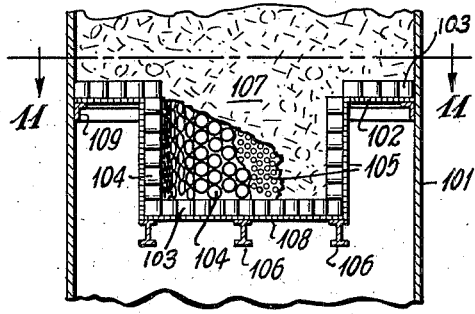

Aug. 20, 1957 F. H. ERDMANN 2,803,528
PACKING SUPPORT FOR FLUID-LIQUID CONTACTING VESSELS
Filed May 13, 1954 3 Sheets-Sheet 3

INVENTOR.
F. H. Erdmann
BY
ATTORNEYS

United States Patent Office 2,803,528
Patented Aug. 20, 1957

2,803,528

PACKING SUPPORT FOR FLUID-LIQUID CONTACTING VESSELS

Fred H. Erdmann, Borger, Tex., assignor to Phillips Petroleum Company, a corporation of Delaware Application May 13, 1954, Serial No. 429,572

19 Claims. (Cl. 23—270.5)

This invention relates to fluid-liquid contacting apparatus. In one aspect it relates to a fluid-liquid contacting apparatus in which resistance to fluid-liquid flow through a support for fluid-liquid contacting material in a vessel is decreased below that found in conventional supports for fluid-liquid contacting material. In still another aspect it relates to apparatus in which the contacting material support possesses an area open for fluid-liquid flow as great as that of the contact material on the support.

An object of my invention is to devise an apparatus for use in fluid-liquid contacting apparatus which permits passage of greater fluid-liquid throughputs than contacting conventional apparatus.

Another object of my invention is to devise an apparatus for use in fluid-liquid contacting operations in which the contact material support element contains as great free area for the passage of fluids in process as does the contacting material supported by the support element.

Yet another object of my invention is to provide an apparatus for use in fluid-liquid contacting operations which permits greater fluid-liquid flow per unit of cross sectional area of the contacting vessel.

Another object of my invention is to provide such an apparatus which is relatively inexpensive to manufacture and to install.

Still other objects and advantages of my invention will be realized by those skilled in the art upon reading the following disclosure which taken with the attached drawing forms a part of this specification.

I accomplished these and other objects and advantages by providing a fluid-liquid contacting system comprising, in combination, a vertically extending tower, a generally horizontal support for solid particulate packing material disposed across said tower, said support comprising a plurality of horizontal foraminated plates disposed in vertically spaced horizontal planes, the combined area of said horizontal plates being substantially equal to the cross sectional area of said tower, said horizontal plates being connected by at least one vertically disposed foraminated sheet to form said support into a continuous structure across said tower, and a bed of said material supported by and extending above said plates and sheet, the foraminations in said plates and sheet being small enough to arrest downward flow of said material, and the total combined area of all foraminations in said vertical sheet and horizontal plates being at least as great as the free space between the particles of said material across the cross section of said tower in said bed above said support.

In the drawing, Figure 1 represents an elevational view, partly in section, of one form of fluid-liquid contacting apparatus of my invention.

Figure 2 illustrates a broken away elevational view, partly in section, of another embodiment of my apparatus.

Figure 3 is the plan view of the apparatus taken on the line 3—3, of Figure 2.

Figure 4 is an elevational view, partly in section, of another embodiment of my invention.

Figure 5 is a plan view taken on the line 5—5 of Figure 4.

Figure 6 is an elevational view, partly in section, of still another embodiment of my invention.

Figure 7 is a plan view taken on the line 7—7 of Figure 6.

Figure 8 is an elevational view, partly in section, of still another embodiment of my invention.

Figure 9 is a plan view taken on the line 9—9 of Figure 8.

Figure 10 is an elevational view, partly in section, of yet another embodiment of my invention.

Figure 11 is a plan view taken on the line 11—11 of Figure 10.

Figure 12:
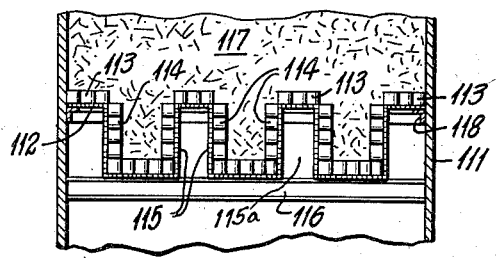
Figure 12 is an elevational view, partly in section, of still another embodiment of my invention.

In conventional vapor-liquid or liquid-liquid contacting towers, which contain vapor-liquid or liquid-liquid contact promoting material there is ordinarily at least one structural support for the contact promoting material and structural supports which usually impart a greater resistance to vapor-liquid or liquid-liquid flow than even the contact promoting packing material. Trays or support elements must be sufficiently strong mechanically to support the dead weight of the packing material, hence the supports cannot contain too great a percentage of open or free area. Another point which further restricts flow is that the contacting material at least partially covers some perforations or open spaces in the support members. According to my invention I have devised an apparatus for markedly increasing the free cross sectional area of the contacting material support as hereinafter described. Furthermore, according to my invention I prefer to increase the free cross sectional area to an amount at least equal to the free cross sectional area of the packing material supported by my support element.

Referring now to the drawing and specifically to Figure 1, I have illustrated a more or less conventional liquid-liquid or fluid-liquid contacting tower provided with two sections or bodies of contacting material. Each of these sections of contacting material is supported by a separate support element. According to this figure reference numeral 21 identifies the contacting tower while the upper section of the tower wall is identified by a reference numeral 22. A lower and larger diameter section is identified by reference numeral 23. The vessel is provided with fluid inlet and outlet pipes 24, 25, 44, 47, 32 and 33, as shown. Pipes 32 and 33 connect to pipe 30, as illustrated. Still another pipe 42 is shown which leads from the tower and connects with one side of a heat exchanger 43. The other side of this heat exchanger is connected to a pipe 48 which is connected to the above-mentioned pipe 44.

At a level somewhat above inlet pipe 32 is a perforate plate element 49a which is connected or attached to the side wall of the vessel. In conventional fluid-liquid treating apparatus such a plate element is usually a circular plate extending across the entire cross section of the vessel. According to my invention this plate element 49a is connected or attached to the side wall of the vessel but contains a generally rectangular opening at approximately the center of the plate. Attached to the edges of this rectangular opening are vertically disposed perforate plates 27. Four such perforate plates are used, in one embodiment of the invention, and the upper edges of these plates define a rectangle of the same size as that defined by the above-mentioned edges of plate 49a. A perforate plate 49 is positioned over the rectangular opening and is attached to the upper edges of the vertical plates 27 in such a manner that the entire support element is one continuous support element. The perforations or foraminations in the plate 49a, plates 27 and plate 49 are of such a size that packing material supported thereon will be retained. In case the packing material is ceramic rings, such as Raschig rings, these foraminations are sufficiently small that the Raschig rings will not pass therethrough. It is preferred that the foraminations be sufficiently small that broken pieces, that is larger broken pieces of such ceramic rings will lnot pass therethrough.

In the upper section of contacting tower 21 loose contacting material such as Raschig rings is identified by reference numeral 28. From the construction of the contacting material support as just described it is realized by those skilled in the art that the support area has been increased by the area of the vertical plates 27 over the area of a cross section of the vessel. For example, if the free area of a plane support element extending directly across the cross section of the vessel contains, for example, 25 square feet of free area, then by addition of vertical plates 27 it is obvious that the free area of the support element is increased by the amount of free area contained in the vertical plates 27 and such a support element will exhibit less resistance to fluid-flow than the above-mentioned plane support of the prior art. I prefer to employ the vertical plates 27 of such area that the sum of the free areas of the foraminations in plates 27 plus the area of the foraminations in plates 49 and 49a is at least equal to the free area of the packing material supported.

In about the central portion of vessel 21 is illustrated another mass of contacting material 31 supported by another support element similar to that described above. This second support element is constructed in a manner similar to that described above and is made up of a plate 35a having a rectangular opening in its center. Disposed around the edges of this opening are four vertically disposed perforate plated 35 on top of which is placed a perforate plate 31a. This second support assembly is intended to possess the same free area relation relative to contact material 31 which it supports as described above relative to the above-mentioned support element.

I have found that when such packing rings such as Raschig rings, are used, it is preferable to position very carefully the first layer of rings on the support member. Thus, on the plate 49 I position Raschig rings 50 in such a manner that their axes are vertical, or in other words, parallel, to the axis of the vessel. I position a layer of rings 29 in contact with the vertical plates 27 in such a manner that their axes are perpendicular to the plane of plates 27. Packing rings placed directly upon these especially positioned rings are placed thereon very carefully but with their axes disposed at random. After at least one layer or so of rings is carefully placed on the positioned rings, the remainder of the packing rings are added, but with sufficient care that ring breakage will be held to a minimum.

Ceramic rings positioned on plate 35a are identified by reference numeral 34a while those placed in contact with the vertical plates 35 are identified by reference numeral 34.

To complete the general construction of the contacting vessel 21 a spray ring 26 is disposed in the vessel as shown and is attached to pipe 25. In a liquid-liquid contacting vessel, such as used in solvent extractions operations the ring 26 is used for introduction of the solvent in case the solvent is specifically heavier than the material being solvent extracted. In like manner a spray ring 36 is attached to pipe 32 for introduction of liquid to be extracted in case feed material is desired to be introduced at a level above packing material 31 and below the upper packing material 28. Still another spray ring 37 is attached to pipe 33 at a level below the lower body of contacting material.

The pipe 24, in this case, provides an outlet for raffinate phase while the pipe 47 is the outlet for extract phase. In case a refluxing liquid is used for increase the purity of extract material, reflux material is introduced into the system through pipe 48, from a source not shown. In case temperature adjustment in the lower portion of the vessel is required a doughnut ring or tray 40 is provided, as shown, to which pipe 42 is connected. Droplets of solvent-rich phase, identified by reference numeral 39, flow downward through a liquid phase 38 and at least a portion of these droplets fall into the doughnut ring 40 to form an intermediate extract phase 41. At least a portion of this intermediate extract phase is then withdrawn through pipe 42 and is either heated or cooled, as desired, in exchanger 43 and is introduced into a body of extract phase 46 through a spray ring 45.

While the contacting material supports described above in relation to Figure 1 are supports having one raised section rectangular in form, I do not wish to be limited by this embodiment of my invention since other forms are also efficient in increasing the free cross sectional area of the support element.

In Figure 2 is illustrated an embodiment of my invention in which a plurality of such rectangular shaped extensions, for example, three are shown. In this figure reference numeral 61 identifies the side wall of a contacting vessel. A perforate or foraminate plate 67 is provided with three rectangular openings. These openings are surrounded by vertically disposed perforate plates 68 upon the top edges of which are positioned perforate plates 69. These perforate plates 69 are intended to close the support against passage of packing material. In this embodiment each of the rectangular sections is intended to increase the free space of the support in such a manner that the several rectangular sections and the plate 67 together contain the same number of square feet of free space as contained by the packing material supported thereon. This packing material is identified by reference numeral 66. I prefer to arrange the first layer of ceramic rings in a manner similar to that described relative to the column of Figure 1. By such arrangements rings 64 are positioned vertically while rings 65 are positioned horizontally against the vertical plates 68. A support ring 70 is attached to the side wall 61 in such a manner that this entire material support assembly rests upon this ring. If further support is necessary I provide cross beams 62 and 63 as illustrated.

Figure 3 of the drawing is a plan view taken on the line 3—3 of Figure 2 and is intended to illustrate the appearance of the contact material support embodiment illustrated in Figure 2 with parts broken away. The contact material 66 (of Figure 2) is not shown in Figure 3. Only a portion of the vertically arranged rings 64 is shown in place and likewise only a portion of the horizontally arranged rings 65 is shown.

The main packing material support elements which are hereinbefore termed perforate or foraminate plates are in some instances grid elements covered by retaining screens. Such grids and retaining screens are common structural materials and can be met in some instances in such installations, and are well known to those skilled in this art. The foraminate plates, are, in some instances, merely steel plates with perforations made by drilling holes or the holes can be punched. The holes, if drilled, obviously are round while punched holes can be round or can be square or any other configuration of cross section desired.

Figure 14:
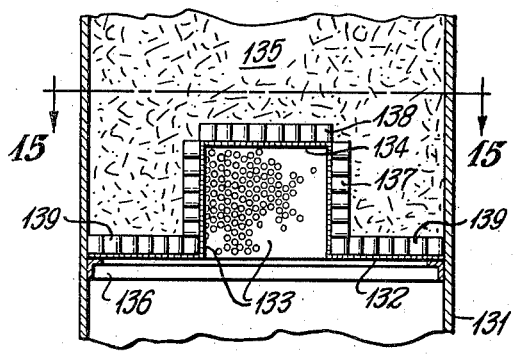
Figure 14 is an elevational view partly in section of still another embodiment of my invention.
Figure 15:
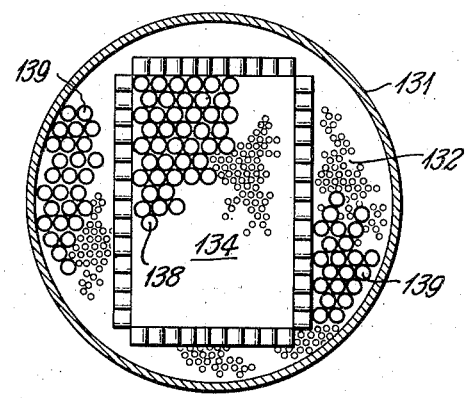
Figure 15 is a plan view taken on the line 15—15 of Figure 14.

In Figure 4 of the drawing is illustrated an embodiment of my invention in which there is one section of generally rectangular form for increasing the contacting material support area and the free area of the support. In this case the assembly is positioned in a vessel having a wall 71 of conventional form. The support itself comprises a perforate or foraminate tray or plate 72 having a rectangular opening centrally located therein. From the edges of this rectangular opening there depends downward four vertically arranged perforate plates 77. Disposed against the bottom edges of these four plates is a perforate plate 78 which closes the support assembly against downward passage of contacting material. I prefer to arrange one layer of, for example, Raschig rings contacting material 73 on the horizontal plate members in such a manner that their axes are parallel to the axis of the vessel. As in Figure 2 a layer of Raschig rings 74 is disposed adjacent each of the vertical plates 77 in such a manner that their axes are horizontal. Disposed around the periphery of the vessel is a support ring 79 upon which the perforate tray 72 rests. Beams 75 are positioned immediately below the lower horizontal plate 78 as further support elements. The Raschig rings or other packing material 76 is supported by the tray and rests upon the first specifically arranged layer of rings. Figure 5 is a plan view, in part, looking upward from the line 5—5 of Figure 4 with a portion of plates 72 and 78 broken away. In Figures 4 and 5 the horizontal plate 78 is illustrated as supported at least in part by beams 75. In this plate 78 are seen perforations 78a. Likewise, perforations 72a in plate 72 are also shown. The beams 75 are shown extending beyond the limits of plate 78 for attachment to the wall 71 of the vessel. Figure 14 illustrates an embodiment of my invention with the extended surface of the support member extending above the main tray instead of below as in Figure 4. In Figure 14 a support ring 136 is attached to the wall of the vessel, as illustrated, and supported by this ring is a perforate plate 132. This perforate plate has a rectangular opening centrally located, and from the edges of which perforate plates 133 extend upwards to define the sides of a rectangle. Upon the top edges of these vertically upwardly disposed plates is a horizontally positioned plate 134. These several perforate plates, that is, 132, 133 and 134 define the contact material support the perforations of which are sufficiently small as not to permit flow of contact material therethrough. Disposed upon plate 132 is a layer of positioned Raschig rings 139 and upon plate 134 is disposed a layer of rings 138, all of these rings being so arranged that their axes are vertical. A layer of Raschig rings 137 is disposed against all four of the perforate plates 133 in such a manner that their axes are horizontal. Rings or other packing material 135 is disposed upon these positioned layers of rings. Figure 15 is a plan view taken on the line 15—15 of Figure 14 with the packing material 135 removed and showing portions of the trays, tray perforations and positioned rings.

In Figure 6 is illustrated still another embodiment of my invention in which additional free space can be obtained over that provided by conventional horizontal contacting material supports. In this embodiment reference numeral 81 identifies vessel walls within which the support is positioned. A support ring 88, semi-circular in form, is attached to the vessel wall in such a manner as to support a semi-circular perforate plate 82. A second semi-circular half rings 88a is positioned at a level above the level of ring 88 in such a manner as to support a semi-circular perforate plate 82a. The straight edge of plate 82a is intended to be directly above and parallel to the straight edge of plate 82 in such a manner that these edges are connected by a vertically disposed perforate plate 87. The free area of the perforations of plate 87 is the increase in free area obtained in this type of material support. Disposed upon plates 82 and 82a are positioned Raschig rings and positioned against the vertical plate 87 is a layer 84 of horizontally disposed Raschig rings. The Raschig rings or other packing material installed as bulk packing is identified by reference numeral 86. Beams 85 are employed as illustrated as additional support means for this support tray. Figure 7 is a plan view of the embodiment of Figure 6 with bulk packing removed and other parts broken away.

Figure 8 illustrates still another embodiment of my invention. The elevational section of the vessel as illustrated in Figure 8 shows that the raised portion of the material support is circular in form in place of rectangular, as illustrated in Figure 14. This circular form is also seen in Figure 9 which is a plan view taken on the line 9—9 of Figure 8 and with bulk packing removed with parts broken away. In Figures 8 and 9, reference numeral 99 identifies a support ring disposed on the inner wall 91 of the vessel upon which a perforate tray or plate 92 rests. Centrally disposed in plate 92 is a circular opening around which is disposed a vertical disposed cylindrical perforate plate 95. Attached to the upper circular edge of plate 95 is a circular perforate plate 99a. On plates 92 and 99a are disposed the vertically arranged Raschig rings 93 and disposed in contact with the cylindrical plate 95 is a layer of horizontally positioned Raschig rings 94.

Upon these positioned rings 93 and 94 is then added the main bulk of the contacting material 98. Additional beam supports 96 and 97 are provided as shown.

Figure 10 illustrates still another embodiment of my invention in which the extended free support area is obtained by a circular or cylindrical extension similar to that illustrated in Figure 8 but extending downward from the main tray in place of upward. In the embodiment of Figure 10 a support ring 109 is disposed around the inner periphery of the vessel and upon this ring is disposed a perforate or foraminate annular plate 102. Around the inner circumference and depending downward from the inner edge of annulus 102 is a cylindrical perforate plate 105. Attached to the lower edge of this plate is a circular plate 108. This latter plate is supported at least in part by beams 106. Disposed upon the horizontal plates of this embodiment are vertically arranged Raschig rings 103 while adjacent the inner wall of the cylinder 105 is the layer of horizontally disposed Raschig rings 104. Upon these positioned rings is disposed a main bulk of packing material 107. Figure 11 is a plan view looking downward from line 11—11 of Figure 10 with parts broken away and with the bulk packing removed.

In Figure 12 is illustrated an embodiment of my invention with the rectangular supports extensions extending downward from the main tray in place of extending upward as in Figure 2. In this embodiment a support ring 118 is disposed around wall 111 of the vessel. Upon ring 118 rests a horizontally disposed perforate tray 112. This perforate tray is provided, as illustrated in Figure 12, with three rectangular openings downward from the edges of which extend perforate plates 115 and 115a forming the sides and ends, respectively, of three rectangles. A layer of Raschig rings 113, vertically arranged, is positioned on all horizontal perforate surfaces. Horizontally disposed rings 114 are positioned adjacent all these vertical surfaces. Upon these positioned rings is added the main bulk of contacting material 117. One or more beam 116 supports are provided, as illustrated, for carrying at least in part the dead weight of the support with its load of contacting material.

Figure 13:
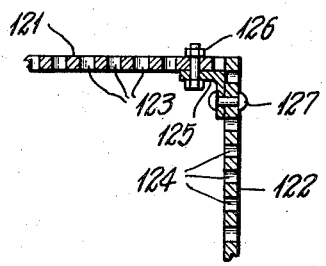
Figure 13 is an illustration, partly in section, of a portion of my apparatus.

In Figure 13 is illustrated one means of fastening perforate plate elements of the several figures to one another. While one mode of fastening is illustrated, any suitable means of attachment as preferred by a designer can be used. In the illustration of Figure 13 a horizontal perforate plate 121 is attached to a vertical perforate plate 122 by an angle iron 125. A bolt 126 is illustrated as fastening the angle iron 125 to plate 121 while a rivet 127 is illustrated as fastening the angle iron 125 to the vertical plate 122. Still other means of fastening these plates together are used in certain cases, for example, the angle iron 125 in one case can be welded to plate 122 and to plate 121. While in still another case the edges of the plates 121 and 122 can be welded directly to one another so that such an angle iron as angle 125 is not necessary. Plates 121 and 122 are illustrated as being provided with perforations 123 and 124 respectively.

In one case, as an example of my invention, a contact material support as illustrated in Figures 1, 14 and 15, was assembled in a liquid-liquid contacting vessel. The upper section of the vessel had an inside diameter of 10 feet and the rectangular opening centrally positioned in a contacting material support tray was about 7 feet 9¼ inches long by 3 feet 4¾ inches wide. Around this opening was disposed vertically perforate plates and upon the upper horizontal edges of these plates was positioned the rectangular support element which was cut from the original plane support. The several vertically arranged perforate plates were bolted to one another by the use of a angle irons. The rectangular perforate plate was also bolted to the top edges of these vertical plates by similar angular members to form a generally horizontally disposed rigid support element. The vertical height of the vertically arranged perforate plates was approximately 12 inches so that the area of the actual metal support was increased by the sum of the areas of the four vertically disposed plates, the sum being approximately 22 square feet. The original perforate flat grid or plate possessed 17 square feet of free area. Inserting the vertical plates to increase the plate area by 22 square feet increased the free area of the support by 14 square feet, giving a total of 31 square feet of free area. Raschig ring packing material, of which the rings were ceramic rings of 1½ inches outside diameter by 1½ inch long and 1 inch inside diameter were used. These ring dimensions gave rings of 1½ inch outside diameter by 1½ inch long with walls ¼ inch thick. When such ceramic rings are positioned at random in a 10-foot diameter contacting vessel the free area in a horizontal section of this packing was 58 square feet. Thus, it is seen that by providing the raised rectangular section it further increased the free space of the support tray from 17 to 31 square feet. By constructing the rectangular raised section analogous to the one herein described having a height of 3 feet in place of 1 foot provides a metal support tray having about 59 square feet of free space when using the same materials of construction.

Thus, it is seen by using my invention to increase the free area of a contacting material support that a conventional bottleneck is eliminated and contacting vessel throughputs can be markedly increased before flooding occurs at contact material support levels.

In cases in which there are a plurality of small masses of contact material and if each mass is supported by a support element of the prior art resistance to flow is markedly increased throughout the length of such a vessel. It is obvious that by employing my invention to increase the free area of the contact material support resistance to fluid-flow is markedly decreased with a resultant corresponding decrease of pressure drop throughout the length of the vessel.

While it is not critical when Raschig rings are used as the fluid-liquid contacting material to position the first layer of Raschig ring with their axes perpendicular to the surface against which the rings rest, it is preferred to so position this first layer of rings. The reason for this arrangement of first layer of rings is that the free area of a layer of rings positioned with their axes so arranged is greater than if the rings were positioned at random. Furthermore, metal Raschig rings having thinner walls can be used to assist in increasing the free area adjacent packing material support are sometimes used but even with these thin metal rings when the first layer is positioned as herein preferred the free area is increased over their random packing.

The vertical plates disposed above and below the main perforate or foraminate trays of my invention can, in some instances, be made of screen material, woven of heavy gauge wire. Plates made of such material have a relatively high percentage of free space and are adapted to passing fluids relatively freely.

The bulk fluid-liquid contacting or packing material as contemplated herein can in some instances be broken material, as broken bricks, or hollow or solid spheres, and the like. I prefer, however, to use Raschig ring type packing.

Fluid-liquid contacting material supports such as herein disclosed are used in liquid-liquid contacting towers such as, for example, those used in solvent extraction operations. Such supports can be used in vapor-liquid contacting operations such as in gasoline plant absorption operations, gasoline plant absorption oil stripping operations and in any other vapor-liquid contacting operations in which it is desired to use packing material for improving contact between the vapor and liquid phases.

My invention finds special utility in solvent extraction operations and in such operations when using my contacting material support as illustrated herein throughput or tower capacity has been markedly increased before flooding.

While certain embodiments of the invention have been described for illustrative purposes, the invention obviously is not limited thereto.

What is claimed is:

1. A fluid-liquid contacting system comprising, in combination, a vertically extending tower, a generally horizontal support for solid particulate packing material disposed across said tower, said support comprising a plurality of horizontal foraminated plates disposed in vertically spaced horizontal planes, the combined area of said horizontal plates being substantially equal to the cross sectional area of said tower, said horizontal plates being connected by at least one vertically disposed foraminated sheet to form said support into a continuous structure across said tower, the foraminations of said plates and sheet being distributed throughout the entire areas thereof, and a bed of said material supported by and covering the support, the foraminations in said plates and sheet being small enough to arrest downward flow of said material, and the total combined area of all the foraminations in said vertical sheet and horizontal plates being at least as great as the free space between the particles of said material across the cross section of said tower in said bed above said support.

2. In the fluid-liquid contacting system of claim 1 wherein at least one of said horizontal foraminated plates is supported by the wall of said tower and said vertically disposed foraminated sheet is positioned above said one of said horizontal plates.

3. In the fluid-liquid contacting system of claim 1 wherein at least one of said horizontal foraminated plates is supported by the wall of said tower and said vertically disposed foraminated sheet is positioned below said one of said horizontal plates.

4. A fluid-liquid contacting system comprising, in combination, a vertically extending tower, a generally horizontal support for solid particulate packing material disposed across said tower, said support comprising a plurality of horizontal foraminated plates disposed in vertically spaced horizontal planes, the combined area of said horizontal plates being substantially equal to the cross sectional area of said tower, said horizontal plates being connected by vertically disposed foraminated sheets to form said support into a continuous structure across said tower, the foraminations of said plates and sheet being distributed throughout the entire areas thereof, and a bed of said material supported by and covering the support, the foraminations in said plates and sheets being small enough to arrest downward flow of said material, and the total combined area of all the foraminations on said vertical sheets and horizontal plates being greater than the free space between said particles of said material across the cross section of said tower in said bed above said support.

5. In the fluid-liquid contacting system of claim 4 wherein at least one of said horizontal foraminated plates is supported by the wall of said tower and said vertically disposed foraminated sheets are positioned above said one of said horizontal plates.

6. In the fluid-liquid contacting system of claim 4 wherein at least one of said horizontal foraminated plates is supported by the wall of said tower and said vertically disposed foraminated sheets are positioned below said one of said horizontal plates.

7. A fluid-liquid contacting system comprising, in combination, a vertically extending tower, a generally horizontal support for solid particulate packing material disposed across said tower, said support comprising a plurality of horizontal foraminated plates disposed in vertically spaced horizontal planes, the combined area of said horizontal plates being substantially equal to the cross sectional area of said tower, said horizontal plates being connected by one vertically disposed foraminated sheet to form said support into a continuous structure across said tower, the foraminations of said plates and sheet being distributed throughout the entire areas thereof, and a bed of said material supported by and covering the support, the foraminations in said plates and sheet being small enough to arrest downward flow of said material, and the total combined area of all the foraminations on said vertical sheet and horizontal plates being greater than the free space between said particles of said material across the cross section of said tower in said bed above said support.

8. A fluid-liquid contacting system comprising, in combination, a vertically extending tower, a generally horizontal support for solid particulate packing material disposed across said tower, said support comprising a foraminated plate element disposed horizontally across said tower, said plate element having a rectangular opening therein, foraminated vertically positioned plates enclosing said opening above said foraminated plate element, a foraminate rectangular plate disposed on the upper edges of said vertically positioned plates to form said support into a continuous structure across said tower, and a bed of said material supported by and covering the upper surface of said plate element, the surfaces of said vertically positioned plates facing the walls of said tower, and the upper surface of said rectangular plate, the foraminations in said plates and plate element being small enough to arrest downward flow of said material, and the total combined area of all foramination in said plates and plate element being at least as great as the free space between said particles of said material across the cross section of said tower in said bed above said support.

9. A fluid-liquid contacting system comprising, in combination, a vertically extending tower, a generally horizontal support for solid particulate packing material disposed across said tower, said support comprising a foraminated plate element disposed horizontally across said tower, said plate element having at least one rectangular opening therein, foraminated vertically positioned plates enclosing said opening below said foraminated plate element, a foraminate rectangular plate disposed on the lower edges of said vertically positioned plates to form said support into a continuous structure across said tower, and a bed of said material supported by and covering the upper surface of said plate element, the surfaces of said vertically positioned plates opposite the walls of the tower, and the upper surface of said rectangular plate, the foraminations in said plates and plate element being small enough to arrest downward flow of said material, and the total combined area of all foramination in said plates and plate element being at least as great as the free space between said particles of said material across the cross section of said tower in said bed above said support.

10. An apparatus in which to conduct a fluid-liquid contacting operation comprising a fluid-tight vessel of circular cross section having fluid inlets and outlets, a perforate support for loose packing material in said vessel, a body of loose packing material covering the entire perforate support in said vessel, said perforate support comprising a generally circular perforate tray disposed across the cross section of said cylindrical vessel, at least one rectangular opening in said tray, said opening having at least one pair of parallel sides, a separate rectangular perforate plate extending vertically upward from the entire length of each side of said pair of parallel sides, a perforate plate disposed against the top edges of the vertically disposed plates in such a manner as to close said opening against passage of said loose packing material, a support ring disposed below and along the outer circumference of said circular tray, said support ring being attached to the inner wall of said vessel to support at least in part said perforate support assembly and loose packing material, the sum of the cross sectional areas of the perforations of the perforate members being at least as great as the free cross sectional area of said loose packing material in said vessel.

11. An apparatus in which to conduct a fluid-liquid contacting operation comprising a fluid-tight vessel of circular cross section having fluid inlets and outlets, a perforate support for loose packing material in said vessel, a body of loose packing material covering the entire perforate support in said vessel, said perforate support comprising a generally circular perforate tray disposed across the cross section of said cylindrical vessel, at least one rectangular opening in said tray, said opening having at least one pair of parallel sides, a separate rectangular perforate plate extending vertically downward from the entire length of each side of said pair of parallel sides, a perforate plate disposed against the lower edges of the vertically downward disposed plates in such a manner as to close said opening against passage of said loose packing material, a support ring disposed below and along the outer circumference of said circular tray, said support ring being attached to the inner wall of said vessel to support at least in part said perforate support assembly and loose packing material, the sum of the cross sectional areas of the perforations of the perforate members being at least as great as the free cross sectional area of said loose packing material in said vessel.

12. A support assembly for loose packing material in a fluid-liquid contacting vessel comprising, a perforate tray adapted to be disposed generally horizontally and completely across the cross section of said contacting vessel, at least one opening in said tray having at least one pair of parallel sides, a separate rectangular perforate plate extending vertically upward from the entire length of each side of said pair of parallel sides, a perforate plate disposed against the top edges of the vertically upward disposed plates in such a manner as to close said opening against passage of said loose packing material, the entire support assembly being adapted to be in contact with and to support said loose packing material, means adapted to be attached to the inner wall of said vessel to support at least in part the perforate packing support and loose packing material, and the sum of the cross sectional areas of the perforations of the assembly being as great as the free cross sectional area of said loose packing material in said vessel.

13. A support assembly for loose packing material in a fluid-liquid contacting vessel comprising, a perforate tray adapted to be disposed generally horizontally and completely across the cross section of said contacting vessel, at least one opening in said tray having at least one pair of parallel sides, a separate rectangular perforate plate extending vertically downward from the entire length of each side of said pair of parallel sides, a perforate plate disposed against the lower edges of the vertically downward disposed plates in such a manner as to close said opening against passage of said loose packing material, the entire support assembly being adapted to be in contact with and to support said loose packing material, means adapted to be attached to the inner wall of said vessel to support at least in part the perforate packing support and loose packing material, and the sum of the cross sectional areas of the perforations of the assembly being as great as the free cross sectional area of said loose packing material in said vessel.

14. A support assembly for loose packing material in a fluid-liquid contacting vessel comprising, a perforate tray adapted to be disposed generally horizontally and completely across the cross section of said contacting vessel, a rectangular opening in said tray, a rectangular perforate plate extending vertically upward from the entire length of each side of said rectangular opening, a rectangular perforate plate disposed on the top edges of the vertically disposed plates in such a manner as to close said opening against passage of said loose packing material, the entire support assembly being adapted to be in contact with and to support said loose packing material, means adapted to be attached to the inner wall of said vessel to support at least in part the perforate packing support and loose packing material, and the sum of the cross sectional areas of the perforations of the assembly being at least as great as the free cross sectional area of said loose packing material in said vessel.

15. A support assembly for loose packing material in a fluid-liquid contacting vessel comprising, a perforate tray adapted to be disposed generally horizontally and completely across the cross section of said contacting vessel, a rectangular opening in said tray, a rectangular perforate plate extending vertically downward from the entire length of each side of said rectangular opening, a rectangular perforate plate disposed on the lower edges of the vertically disposed plates in such a manner as to close said opening against passage of said loose packing material, the entire support assembly being adapted to be in contact with and to support said loose packing material, means adapted to be attached to the inner wall of said vessel to support at least in part the perforate packing support and loose packing material, and the sum of the cross sectional areas of the perforations of the assembly being at least as great as the free cross sectional area of said loose packing material in said vessel.

16. An apparatus in which to conduct a fluid-liquid contacting operation comprising a fluid-tight vessel of circular cross section having fluid inlets and outlets, a perforate support for loose packing material in said vessel, a body of loose packing material covering the entire perforate support in said vessel, said perforate support comprising a generally circular perforate tray disposed across the cross section of said cylindrical vessel, a rectangular opening in said tray, a rectangular perforate plate extending vertically upward from each side edge and end edge of said rectangular opening, a perforate plate disposed against the top edges of the vertically extending plates in such a manner as to close said rectangular opening against passage of said loose packing material, a support ring disposed below and along the outer circumference of said circular tray, said support ring being attached to the inner wall of said vessel to support at least in part said perforate support assembly and loose packing material, the sum of the cross sectional area of the perforations of the perforate members being at least as great as the free cross sectional area of said loose packing material in said vessel.

17. An apparatus in which to conduct a fluid-liquid contacting operation comprising a fluid-tight vessel of circular cross section having fluid inlets and outlets, a perforate support for loose packing material in said vessel, a body of loose packing material covering the entire perforate support in said vessel, said perforate support comprising a generally circular perforate tray disposed across the cross section of said cylindrical vessel, a rectangular opening in said tray, a rectangular perforate plate extending vertically downward from each side and end edge of said rectangular opening, a perforate plate disposed against the lower edges of the vertically downward extending plates in such a manner as to close said rectangular opening against passage of said loose packing material, a support ring disposed below and along the outer circumference of said circular tray, said support ring being attached to the inner wall of said vessel to support at least in part said perforate support assembly and loose packing material, the sum of the cross sectional area of the perforations of the perforate members being at least as great as the free cross sectional area of said loose packing material in said vessel.

18. A support assembly for loose packing material in a fluid-liquid contacting vessel comprising, a perforate tray adapted to be disposed generally horizontally and completely across the cross section of said contacting vessel, a circular opening in said perforate tray, a perforate plate extending vertically upward from the circumference of said circular opening, a circular perforate plate disposed against the top edge of said upward extending plate in such a manner as to close said opening against passage of loose packing material, the entire support assembly being adapted to be in contact with and to support said loose packing material, means adapted to be attached to the inner wall of said vessel to support at least in part the perforate packing support and loose packing material, the sum of the cross sectional areas of the perforations of the assembly being at least as great as the free cross sectional area of said loose packing material in said vessel.

19. A support assembly for loose packing material in a fluid-liquid contacting vessel comprising, a perforate tray adapted to be disposed generally horizontally and completely across the cross section of said contacting vessel, a circular opening in said perforate tray, a perforate plate extending vertically downward from the circumference of said circular opening, a circular perforate plate disposed against the lower edge of said downward extending plate in such a manner as to close said opening against passage of loose packing material, the entire support assembly being adapted to be in contact with and to support said loose packing material, means adapted to be attached to the inner wall of said vessel to support at least in part the perforate packing support and loose packing material, the sum of the cross sectional areas of the perforations of the assembly being at least as great as the free cross sectional area of said loose packing material in said vessel.

References Cited in the file of this patent

UNITED STATES PATENTS

| 1,981,818 | Whitner, Jr. | Nov. 20, 1934 |
| 2,333,193 | Persson et al. | Nov. 2, 1943 |
| 2,468,044 | Davis | Apr. 26, 1949 |
| 2,711,307 | Milmore | June 21, 1955 |